United States Patent [19]
Grant

[11] Patent Number: 5,304,253
[45] Date of Patent: Apr. 19, 1994

[54] METHOD FOR CLEANING WITH A VOLATILE SOLVENT

[75] Inventor: David C. H. Grant, Selbyville, Del.

[73] Assignee: Baxter International Inc., Deerfield, Ill.

[21] Appl. No.: 842,002

[22] Filed: Feb. 25, 1992

Related U.S. Application Data

[63] Continuation-in-part of Ser. No. 581,020, Sep. 12, 1990, Pat. No. 5,106,404.

[51] Int. Cl.$^5$ .......................... B08B 3/00; B08B 3/02; B08B 5/00; B08B 5/04
[52] U.S. Cl. .......................... 134/26; 134/31; 134/40; 134/12; 134/21
[58] Field of Search .......................... 134/31, 26, 40, 21, 134/12

[56] References Cited

U.S. PATENT DOCUMENTS

| 3,714,049 | 1/1973 | Charle et al. | 252/90 |
|---|---|---|---|
| 3,901,817 | 8/1975 | Murphy | 252/67 |
| 3,904,430 | 9/1975 | Tipping et al. | 134/31 |
| 4,174,295 | 11/1979 | Bargigia et al. | 252/90 |
| 4,303,454 | 12/1981 | Petterson et al. | 134/31 |
| 4,303,536 | 12/1981 | Orfeo et al. | 252/67 |
| 4,400,183 | 8/1983 | Henrich et al. | 55/44 |
| 4,510,064 | 4/1985 | Ermak | 252/67 |
| 4,515,695 | 5/1985 | Knupp, Jr. | 210/634 |
| 4,810,403 | 3/1989 | Bivens et al. | 252/67 |
| 4,810,412 | 3/1989 | Merchant et al. | 134/40 |
| 4,812,256 | 3/1989 | Merchant et al. | 134/40 |
| 4,814,100 | 3/1989 | Merchant et al. | 134/40 |
| 5,045,117 | 9/1991 | Witherell | 134/21 |
| 5,135,676 | 8/1992 | Buchwald et al. | 134/38 |

FOREIGN PATENT DOCUMENTS

| 0080407 | 6/1983 | European Pat. Off. |
| 0209307 | 1/1987 | European Pat. Off. |
| WO92/14558 | 9/1992 | Fed. Rep. of Germany |
| 59-21632 | 2/1984 | Japan |
| WO90/06189 | 6/1990 | PCT Int'l Appl. |
| 2085310 | 4/1982 | United Kingdom |

*Primary Examiner*—Theodore Morris
*Assistant Examiner*—Zeinab El-Arini
*Attorney, Agent, or Firm*—Charles R. Mattenson; Ronald E. Barry; Paul C. Flattery

[57] ABSTRACT

A method is provided for cleaning an article with a solvent having a boiling point such that the solvent is a gas at room temperature and one atmosphere pressure. Such a method includes the steps of disposing the article in a chamber, introducing the solvent into the chamber so that the solvent contacts the article, pressurizing the chamber so that the solvent is in a liquid state and removes contaminants from the article, purging the chamber to remove the solvent, and removing the treated article from the chamber. Such a system permits the use of liquids having boiling points lower than room temperature, such as certain $C_1$–$C_4$ halocarbons, which liquids have not previously been used as cleaning solvents.

32 Claims, 2 Drawing Sheets

METHOD FOR CLEANING WITH A VOLATILE SOLVENT

This application is a continuation-in-part of U.S. patent application Ser. No. 581,020, filed Sep. 12, 1990, U.S. Pat. No. 5,106,404, issued Apr. 21, 1992.

FIELD OF THE INVENTION

The present invention relates, generally, to the cleaning of articles with volatile solvents such as fluorinated and chlorinated hydrocarbons, and particularly to a cleaning method and apparatus which provides emission control for minimizing the atmospheric introduction of volatile constituents from fluid compositions used to treat the articles.

BACKGROUND OF THE INVENTION

Volatile organic compounds are known to pose health and environmental hazards. On the one hand, ozone depletion and global warming are now attributed to such factors as the release of copious quantities of chlorofluorocarbons (CFC's) and similar volatile compounds. On the other hand, inhalation of volatile constituents, particularly solvents or similar compounds used in a wide range of manufacturing procedures, is known to result in potentially severe health hazards. In all such cases, the characteristics which make these compositions particularly desirable in manufacturing procedures, such as the efficacy of a composition as a solvent or cleaning agent (e.g., volatility), are directly responsible for the deleterious or potentially deleterious effects accompanying their use.

Systems have been devised to minimize solvent loss during or incident to procedures in which these volatile compositions have a tendency to escape to the atmosphere. Some are recovery systems designed to retrieve the fluid and entrained materials resulting from a manufacturing procedure, such as a cleaning procedure, and thence separate the reusable fluid from contaminants. These systems tend to have common limitations or drawbacks. For example, air is often allowed to enter the system and mix with vapor, whereupon removal of the air necessarily implicates loss of volatile constituents as well. More direct sources of solvent loss may be attributed to diffusion, "dragout," and system leaks.

Indirect solvent loss, as in the case of solvent admixed with admitted air, has been addressed most commonly by means of carbon absorbers. Those recovery or control systems can become complicated and hence costly in terms of both capital investment and operating expense. Direct loss is sometimes easier to control, but many potential solutions designed for that purpose can contribute to admission of ambient air to the system, resulting in the types of problems mentioned above. Thus, it is not uncommon to find solvent systems used in, for example, the electronics industry for cleaning printed circuit boards or electronic components, to emit relatively large amounts of solvent vapor, on the order of 8 to 10 pounds of solvent per hour.

Many azeotropes of chlorofluorocarbons such as CFC-113 with alcohols or methylene chloride are known and are used for a variety of purposes. See Freon TMC, Solvent, U.S. Pat. No. 2,999,817, Freon TA Solvent, U.S. Pat. No. 2,999,815, Freon T-P 35 Solvent, U.S. Pat. No. 3,085,116, Freon TES Solvent, U.S. Pat. No. 3,905,009, Freon TMS Solvent, U.S. Pat. No. 3,960,746, and Freon T-DFC Solvent, U.S. Pat. No. 4,182,687. High boiling CFC's are in common use as cleaning solvents, usually in the form of an azeotropic mixture with an alcohol or acetone. See generally Merchant et al. U.S. Pat. Nos. 4,810,412, issued Mar. 7, 1989, U.S. Pat. No. 4,814,100, issued Mar. 21, 1989, and U.S. Pat. No. 4,812,256, issued Mar. 14, 1989, relating to use of $CHF_2CHCl_2$. A pressurized system for recovering dissolved substances from aqueous solution using a mixture of high and low-boiling fluorocarbon solvents has also been proposed. See Knupp, Jr. U.S. Pat. No. 4,515,695, issued May 7, 1985. Henrich et al. U.S. Pat. No. 4,400,183, issued Aug. 23, 1983, describes using $Cl_2CF_2$ as an absorption agent for noble gases, with subsequent desorption.

Many CFC's and HCFC's, such as $CHClF_2$ (HCFC-22) have low boiling points and have accordingly been used only in applications such as aerosol propellants or refrigerants. See Ermak U.S. Pat. No. 4,510,064, issued Apr. 9, 1985, Bivens et al. U.S. Pat. No. 4,810,403, issued Mar. 7, 1989, Orfeo et al. U.S. Pat. No. 4,303,536, issued Dec. 1, 1981, Murphy U.S. Pat. No. 3,901,817, issued Aug. 26, 1975, Charle et al. U.S. Pat. No. 3,714,049 issued Jan. 30, 1973, Bargigia et al. U.S. Pat. No. 4,174,295, issued Nov. 13, 1979, and Japanese Patent Publication 5921632, published Feb. 3, 1984. Solvency, uses and other properties of $CHClF_2$ are discussed in Sander, "Handbook of Aerosol Technology", Second Edition, Rogert E. Krieger Publishing Co., Malabar, Fla., Second Edition, 1987.

A variety of cleaning systems have been proposed which provide for recovery of solvent, e.g., by condensation of solvent vapors. See generally U.K. Patent Application 2,085,310, Apr. 28, 1982, German Patent Publication No. 3,012,759, 1981, and German Patent Publication No. 3,907,437, 1989. A closed system for cleaning articles utilizing a flushing gas circuit is described in European Patent Application No. 331,611, 1989.

Despite the availability of low-boiling halocarbons, no method or system has been proposed enabling use of such compounds in liquid form for cleaning applications in a manner similar to CFC's having higher boiling points.

SUMMARY OF THE INVENTION

The present invention provides an improved emission control system for minimizing the escape of volatile compositions to the atmosphere, particularly solvents associated with industrial cleaning procedures. The present invention advantageously provides such a system, and method for its implementation, which overcomes many of the problems endemic to prior art control systems or solvent recovery techniques. The system of the present invention is designed to provide calculated recoveries well in excess of 99%, eliminating under most practical industrial circumstances all but about 0.5% or less of solvent emission compared to conventional degreasers.

The foregoing, and other advantages, are realized in one aspect of the present invention in a method for controlling atmospheric emission of volatile fluids, comprising the steps of disposing an article to be treated into a chamber capable of maintaining both pressure and effective vacuum, evacuating the chamber to remove virtually all gases, first introducing into the chamber a fluid composition comprised of volatile constituents, such as a solvent for treating the article, recovering the fluid and vapor components of the solvent composition following the treatment step, and subsequently removing residual liquid by flushing the chamber with a drying fluid. Most preferably, the drying fluid is derived from the residual charge of noncondensable gas and solvent vapor within the closed loop system. The temperature of the chamber and its contents may be controlled by heating means such as heating the walls of the chamber or by radiation such as infrared heating.

In a preferred embodiment, the step of recovering the treating or cleaning fluid further comprises the steps of collecting the fluid used during the first processing step and separating it into liquid and gas phases. The method then further comprises the step of fractionating the gas phase, preferably through compression and cooling, to condense and thence recover and recycle volatile constituents. The stripped gas is then preferably heated and used during the second processing step to dry the article contained within the chamber, although it may be used in some circumstances as a desiccating agent without the need to be heated depending on the nature of the process, the gas and the solvent to be expelled from the chamber.

Typically, the chamber is first evacuated by means of a vacuum pump, discharging the contents of the chamber to atmosphere while the chamber is isolated from a recirculating closed loop system. Contrariwise, the chamber is evacuated through the closed loop system following the drying step to enhance the drying process and to return residual solvent vapor to the closed loop system, and the chamber is then isolated before its vacuum is broken. That is most conveniently accomplished by admission of ambient gas, following which the chamber is opened and the article(s) disposed therein for treatment are removed. Dragout is virtually eliminated by removing residual solvent liquid and vapor from the article being processed and from the chamber. Gases admitted into the closed loop system are minimized through these steps of isolation.

The invention further provides a method for cleaning an article with a solvent having a boiling point such that the solvent is a gas at room temperature and one atmosphere pressure. Such a method includes the steps of disposing the article in a chamber, introducing the solvent into the chamber so that the solvent contacts the article, pressurizing the chamber so that the solvent is in a liquid state and removes contaminants from the article, purging the chamber to remove the solvent, and removing the treated article from the chamber. An apparatus for cleaning an article with such a volatile solvent in accordance with this aspect of the invention has a pressure chamber for receiving the article, a pressurizing system capable of maintaining the chamber at an elevated pressure so that the solvent is in a liquid state, a cleaning system that contacts the liquid solvent with the articles in the pressure chamber, and a purging system that removes the liquid solvent from the chamber prior to removal of the article. Such a system permits the use of liquids having boiling points lower than room temperature at 1 atm, which liquids have not previously been used as cleaning solvents.

Other advantages of the present invention, and a fuller understanding of its operation and the system which implements it, will be appreciated upon an examination of the detailed description which follows, taken in conjunction with the drawings.

DETAILED DESCRIPTION OF THE PREFERRED EMBODIMENTS

The present invention relates, generally, to emission control systems for minimizing the atmospheric introduction of volatile constituents from fluid compositions used to treat articles as part of or incident to a manufacturing procedure, and a method therefor. The present invention more particularly relates to a vacuum-to-vacuum emission control system for reducing the atmospheric introduction of volatile organic compounds, especially cleaning solvents such as chlorofluorocarbons, hydrochlorofluorocarbons, chlorocarbons, alcohols, hydrocarbons, and other volatile compounds. Solvents with atmospheric boiling points from that of $HF_4$ ($-128°$ C.) to conventional high boiling solvents such as perchloroethylene (B.P. 121° C.) and trichlorobenzene (B.P. 213° C.) and 3M's Fluorinert FC-71 (B.P. 253° C.) can be used in the system. The use of solvents with boiling points in the range of $-130°$ C. to 255° C. is practical using the system of the invention.

The present invention provides a recirculating closed loop solvent recovery system having the ability to control solvent consumption performance to a level considerably less than 2% of that experienced with conventional degreasers. Solvent consumption for those products in which solvent is irretrievably absorbed will be somewhat higher. Accordingly, the invention will now be described with reference to the preferred implementation of a solvent recovery system used in conjunction with a cleaning process for removing soils from, e.g., a capillary flow dialyzer, a printed circuit board or metal or plastic parts.

Figure 1:
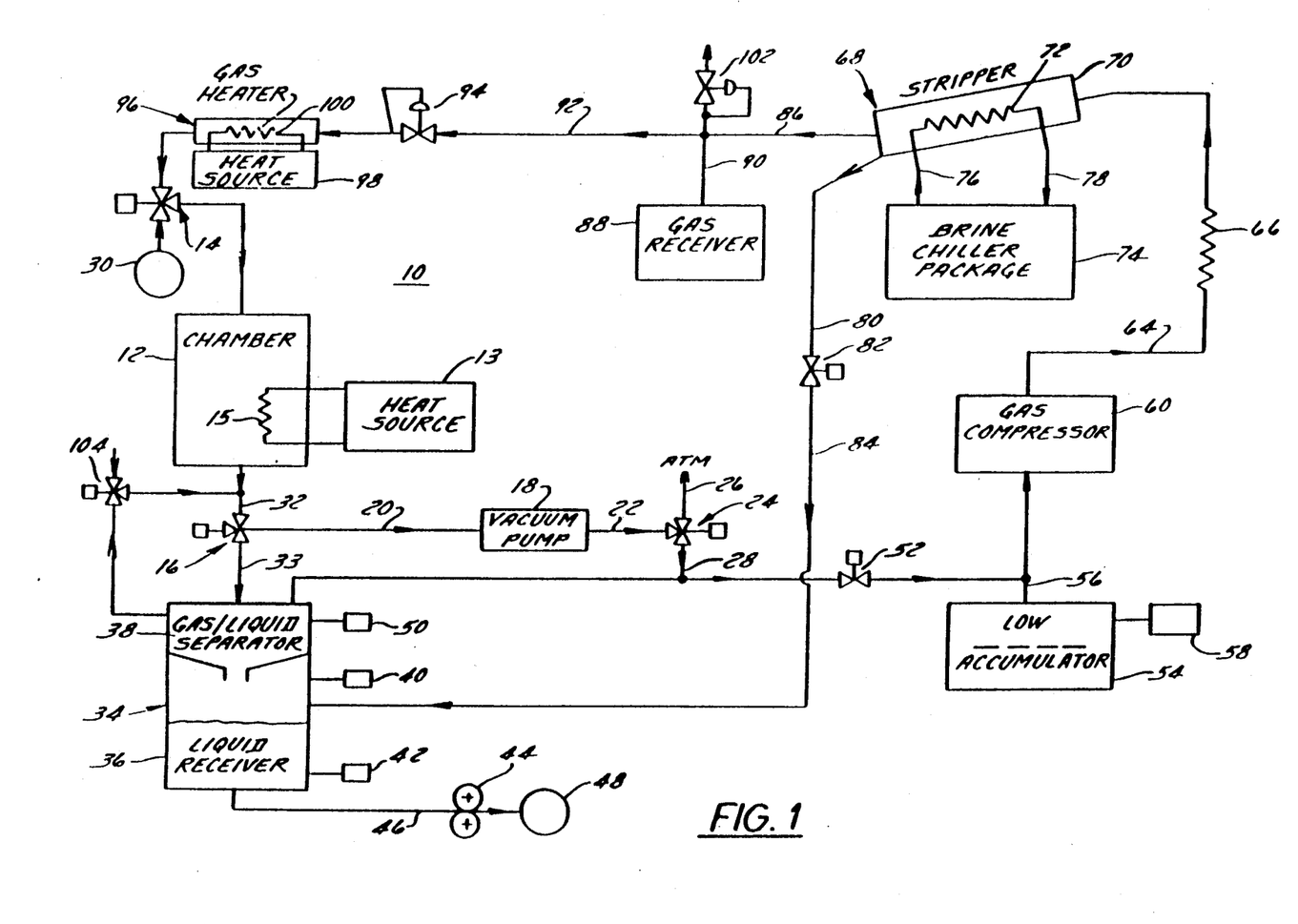
FIG. 1 schematically represents a system suitable to carry out a cleaning process in accordance with the present invention.

Turning to FIG. 1, the emission control system according to the invention, designated generally as 10, is shown to include a treatment chamber designated generally as 12 in which a cleaning or other treatment operation takes place. An important aspect of the emission control system 10 is the ability to isolate the chamber 12 from the remainder of the recirculating closed loop system and thereby control the loss of volatile constituents from the closed loop system or the introduction of gases into the system. This is achieved in the exemplified embodiment by inlet solenoid valves, 14 and 104 and outlet solenoid valve 16. The chamber 12 is operatively associated with a vacuum pump 18, communicating with it via conduit 20 and solenoid valve 16. Vacuum pump 18 communicates alternatively, via a conduit 22 and solenoid valve 24, with either the atmosphere through port 26 or the closed loop system through conduit 28. Accordingly, the interior of chamber 12 may be isolated from the remainder of the closed loop system 10 and its contents may selectively be evacuated or discharged either to the atmosphere or to the closed loop system as demanded by the procedure for which the system is implemented or the stage of operation within that procedure.

The chamber and its contents can be heated by any of a number of heating methods to control its temperature, including heat source 13 and heat exchanger 15 or by infrared radiation, direct conduction or the like. Chamber 12 is sized and configured to receive one or more articles (not shown) to be treated with a fluid composition which is either itself volatile or which is comprised of volatile constituents. Insofar as the chamber serves a principal role of defining a treatment environment separate and distinct from the ambient environment, the chamber 12 also needs to be constructed with sufficient integrity to contain both pressure and vacuum. In the context of the preferred embodiment of the present invention, cleaning processes both above and below ambient pressure may be practiced to take advantage of a wide range of solvents, many, because of their boiling points, are not practical in conventional cleaning processes. Evacuation pressures below ambient may be adequate to practice the current invention, however lower evacuation pressures down to full vacuum will enhance solvent containment efficiency. Regardless, it is important that chamber 12 be designed to maintain both positive and negative levels of pressures with respect to ambient.

The articles to be cleaned in chamber 12 are loaded while the chamber is isolated from the closed loop system by closing solenoid valves 14, 16 and 104, as mentioned above. During loading, gases will enter the interior of the chamber directly and gases will also be either entrained in or carried on or about the articles to be processed. Once the chamber 12 is loaded, and while it remains isolated from the closed loop system, vacuum pump 18 is used to evacuate the interior of chamber 12 and discharge the gas therein to the atmosphere via port 26 of the solenoid valve 24. Once the gases are removed from the interior of chamber 12, the chamber may then be allowed to communicate with the remainder of the closed loop system 10 without undue risk of introducing unwanted material.

After all gases from loading chamber 12 have been discharged, articles within the chamber are ready for treatment, such as a solvent degreasing or a cleaning process, e.g. flushing, spraying, spray-over immersion, ultrasonics, mechanical agitation, etc. The vacuum is broken from inside the closed loop system, by opening solenoid valve 104 to draw gas from gas separator 34. Subsequently, solvent is admitted from a solvent supply 30 via solenoid valve 14 at the inlet of the chamber 12. Solvent is fed into the chamber 12 to carry out the treatment process therein and exits via a line 32, outlet valve 16 and a line 33 to a gas/liquid separator designated generally as 34. The processing fluid, carrying soil, debris, dissolved contamination and entrained gas, is treated in the separator 34 to partition it into a liquid phase and a gas phase. The liquid phase separates gravimetrically to a liquid receiver 36 disposed in the lower confines of the separator 34. The gas phase naturally rises to a gas well 38 in the upper portion of the separator 34.

High and low level switches 40 and 42, respectively, are responsive to the level of the liquid phase within the receiver 36. When the liquid level rises sufficiently to trip the high level switch 40, it energizes a discharge pump 44, which removes liquid from the receiver 36 via a conduit 46 to a solvent reclamation reservoir 48. The solvent is treated in a conventional fashion to remove contaminants from it, and it is then recycled by returning it to the solvent supply reservoir 30.

The gas phase which rises in the well 38 is typically a combination of several components, including solvent vapor, gases which are generated during the treatment process, and residual air constituting the principal components. The gases collect in the well 38 until its pressure rises sufficiently that it must be tapped or bled from the separator 34. A switch 50 senses the pressure buildup of gas within the well 38 and opens solenoid valve 52. Gas is thereby admitted to a low pressure accumulator 54 via a conduit 56. A switch 58 is disposed in cooperative relation with the accumulator 54, and is tripped when the pressure in the accumulator achieves a preset level. At that time, switch 58 applies power to a gas compressor 60, which compresses the gas and discharges it to line 64 at the outlet of the compressor. The compressor 60 will continue to operate until the pressure in the low pressure accumulator 54 drops to an established level; likewise, gas will be bled from the well 38 for so long as the pressure head therein remains above the setting on pressure switch 50. This arrangement permits the compressor to remove and compress gas from the well 38 without experiencing short cycling, which could otherwise occur due to minor fluctuations in pressure in the well 38.

Compressed gas exiting the compressor 60 via the line 64 is delivered to an after cooler 66 for removing the heat of compression. Thereafter the gas is routed to a stripper designated generally as 68. The stripper is comprised of a housing 70 for a heat exchanger 72 across which the compressed gas flows. The heat exchanger 72 is chilled by a brine solution, provided by a brine chiller package 74 which supplies a cold brine solution to heat exchanger 72 via an inlet 76 and removes it through an outlet 78.

The stripper 68 is controlled to provide a temperature below the dew point of the volatile constituents of the compressed gas. These constituents, typically solvent vapor and the like, condense and are ported from the stripper via line 80, through solenoid valve 82 and conduit 84 to the liquid receiver 36. In this fashion, condensed volatile gas, which may serve as useful solvent, is returned to the system for that purpose.

Gas which has been stripped of the higher boiling point constituents is tapped from the stripper 68 via an outlet port communicating with conduit 86 and is admitted to a high pressure accumulator or gas receiver 88 via line 90. Gas receiver 88 houses the stripped gas which has the least solvent content of the gas in the closed loop system, on a weight of solvent per unit of volume of gas basis. This gas is supplied through line 92 and a pressure responsive valve 94 to a gas heater designated generally as 96. The gas heater 96 is comprised of a heat source 98 and a heat exchanger 100. To the extent that the volume of the stripped gas in the receiver 88, rises to too great a level resulting in increased pressure in the system, e.g. from gas ingestion due to incomplete vacuum being achieved in the initial evacuation steps, it is purged from the system via pressure relief valve 102. The gas released by valve 102 can be further treated with a carbon adsorber to remove most of the small amount of solvent that the released gas carries with it.

After the parts contained in chamber 12 have been cleaned (during which liquid solvent is admitted to the chamber), the parts are dried or otherwise freed from residual liquid solvent. This is achieved by recirculating heated, stripped gas from heater 96 through valve 14 to the interior of the chamber 12. Heated gas flowing through the chamber vaporizes liquid solvent and thus effects a drying operation by evaporating residual liquid solvent. That gas continues through the chamber, returning through solenoid valve 16 to the gas well 38 in the separator 34 and back to the gas receiver 88, as described above.

The drying function served by heated, stripped gas may equally well be achieved under certain circumstances by a drying gas which does not require heating. For example, depending on the volatility of the fluid composition sought to be purged from the chamber 12, the throughput of drying gas, the physical configuration of the article(s) to be treated, and similar factors, all within the control of the designer, determine whether the stripped gas emanating from stripper 68 may be used directly without the need to be heated and, accordingly, may optionally be heated to greater or lesser degrees to achieve the drying function sought by the designer.

Once the parts have been treated and then dried as described above, a further drying and gas removal step is carried out in the chamber. Chamber 12 is isolated at the inlet, by closing solenoid valves 14 and 104 and at the outlet by closing solenoid valve 16. Vacuum pump 18 is then connected to the chamber by opening solenoid valve 16 to draw down the contents which remain in the chamber 12. These consist essentially of stripped gas and such volatile components as it has entrained, and possibly some residual solvent liquid not removed in the previous drying steps. The residuum is drawn through solenoid valve 16 by vacuum pump 18 and pumped through solenoid 24 and conduit 28 to the gas side of the closed loop system, downstream of the well 38, being directed to the low pressure accumulator 54.

An adequate vacuum is drawn to remove substantially all of the solvent vapor and other gases before the vacuum pump is deenergized. At that juncture the chamber 12, housing clean and dry articles, is ready to be opened to remove them. Solenoid valve 104 is opened to break the vacuum in the chamber 12 to some outside source of gas, e.g. the environment, and allow the operator to gain access to remove the cleaned articles. At that time, the chamber 12 is ready for receiving a new load of articles to be cleaned.

Although the above disclosure of the operation of the system is specific to a simple treatment, purging and drying operation, it should be noted that the system can be used with other than conventional solvents. In this regard, if the chamber pressure is raised, compounds that are gases under normal room conditions (e.g., R-12 or R-22 which boil, respectively, at $-21.7°$ F. and $-41°$ F. at one atmosphere pressure) can be used as a liquid solvent at 130° F. if the pressure is maintained above 185 psig and 300 psig, respectively. The significance of this capability is the ability to use many beneficial solvents in the place of CFC's. The system has the capability of changing the state of being of the solvent from liquid to vapor and back again simply by changing pressure. This is of particular importance in cleaning small crevices where it is necessary to get solvent liquid into the crevice and get it out again, carrying contaminants with it.

As an example of the above, envision a soluble contaminant such as PCB buried in a coil of a transformer winding. Initially, the coil is disposed in the chamber 12, solenoid valve 16 is opened and vacuum pump 18 activated to remove gases from the chamber. Solenoid 16 is closed to seal the chamber and solenoid 14 is opened to the solvent supply. The vacuum in the chamber will cause some of the solvent to evaporate and be drawn into the interstices of the transformer windings. The pressure in the chamber can be raised by a pump (not shown) to a point where, at a specific temperature, the solvent condenses. As the solvent condenses, the volume decreases drawing more solvent vapor into the coil to fill the voids created by the solvent that has already condensed. The coil fills with the liquid solvent and dissolves the PCB contaminant.

The solenoid valve 14 is closed and solenoid 16 opened to allow its vacuum pump 18 to decrease the pressure in the chamber. The liquid solvent will boil drawing the PCB contaminated liquid out of the coil. This can be repeated as many times as deemed necessary to clean the coil once all of the noncondensable gases have been removed by this initial vacuum.

As is evident from the foregoing, the system is isolated from contaminants and gases introduced or potentially introduced, through the chamber 12. The chamber is the only component open to the atmosphere and potential source of contaminants and gases. Conversely, the closed loop system is operational in the treatment of articles within the chamber 12, such as solvent cleaning, only during times when it is otherwise isolated from these sources of gases and contamination. Thus, solvent emission, either directly or indirectly, is substantially preluded, within the general parameters mentioned above.

The system is broadly adaptable to treat a wide variety of articles. Any article containing manufacturing soil which must be removed either during the course of a manufacturing procedure or at the conclusion thereof, and which is susceptible to such a treatment by a volatile composition, may adequately be treated in the system 10. Exemplary of a few applications are the solvent cleaning of electronic components or systems and the solvent cleaning of medical devices or metal or plastic parts. Additionally, it is envisioned that the system can be utilized in the control of emissions from more routine processes, including, for example, dry cleaning. Likewise, a wide array of volatile compositions may adequately be handled by system 10. Appropriately designing the gas compressor and stripping components of the system to achieve proper condensing parameters allows the designer to adapt the For example, using a CFC-113 chlorofluorocarbon solvent, it has been determined that a compression of 60 PSIG and a heat exchange temperature at the stripper of $-26°$ F. will leave a solvent relative humidity of less than about 9%. More generally, however, it has been determined that the dew point leaving the stripper is virtually the same as the temperature of the heat exchanger surface itself, while the dry bulb temperature of the stripped gas may be about 15°-20° F. or higher. Consequently, guided by the principles set forth herein, those ordinarily skilled in this art will have no difficulty designing systems having appropriate capacity and operational characteristics to accommodate virtually all customarily encountered volatile solvents.

Conventional cleaning solvents generally have boiling points above room temperature. These include the common fluorocarbon solvents CFC-113 (i.e., 1,1,2-trichlorotrifluoroethane or $CCl_2FCClF_2$, also known as Freon-TF, R-113, and Genesolve-D) and blends and azeotropes of CFC-113 with alcohols, methylene chloride, acetone, and the like. By contrast, as noted above, HCFC-22 (chlorodifluoromethane or $CHClF_2$, also known as Freon-22, F-22, R-22, and Genetron-22) boils at $-41.36°$ F. at one atmosphere pressure. It is, therefore, a gas at room conditions of temperature and pressure (e.g., 70° F. and 14.696 psia). Conventional cleaning machines have generally been open to the room to facilitate product flow into and out of the cleaning system. Since $CHClF_2$ is a vapor under these conditions, it has not been considered for use as a cleaning solvent.

The present invention provides a system that is isolated from the room during the cleaning steps. The system is capable of operating under pressure sufficient to cause $CHClF_2$ to be a liquid at temperatures of 130° F. or more. Chlorodifluoromethane and other similar solvents can therefore be used for cleaning in accordance with the method of the invention.

$CHClF_2$ has solvent properties similar to $CCl_2FCClF_2$, the main difference being the boiling point. Like $CCl_2FCClF_2$, $CHClF_2$ azeotropes with other compounds, notably dialkyl ethers such as dimethyl ether. Advantages include low toxicity (TLV: 1000 ppm), non-flammability, and selective solvency (KB No.: 25, vs. CFC-113:31). Chlorodifluoromethane azeotropes with dimethyl ether (DME) and can be used as a blended solvent with DME in the system of the invention.

Another mode of application for $CHClF_2$ would be as a blend with other solvents, e.g., methyl, ethyl or isopropyl alcohol. In conventional cleaning systems, the lower boiling component of a blend is emitted preferentially, thus increasing the concentration of the higher boiling component. The closed vacuum-to-vacuum system according to the invention loses so little solvent that two or more constituents of a blend would remain in their original composition over a long period of time. Hence, cleaning with a non-azeotropic solvent blend of a low boiling halocarbon and another solvent, such as an alcohol or ether, becomes possible. In the past there has been strong emphasis on the use of azeotropes of a base solvent (e.g., CFC-113) and other solvents (e.g., alcohols, methylene chloride, acetone, etc.) to enhance solvency performance. With the system of the invention, since so little solvent is lost, non-azeotropic blends of solvents can be used to tailor solvency.

Cosolvents according to the invention for use with low-boiling halocarbons according to the invention include alcohols such as methanol, ethanol, propanol, isopropanol, butanol, glycols, e.g., ethylene glycol, glycerines, ethers such as diethyl or dimethyl ether aldehydes such as formaldehyde, ketones such as dimethyl ketone (acetone), methylethyl ketone (a strong solvent), acids such as formic acid, acetic acid, stearic acid, oleic acid, esters such as ethyl acetate, and compatible mixtures thereof. The weight ratio of $C_1$-$C_4$ fluorocarbon, hydrofluorocarbon or chlorofluorocarbon to the cosolvent is in the range of about 200:1 to 10:1.

A mixture of an HCFC (hydrochlorofluorocarbon) such as $CHClF_2$ and a lower alkyl ether such as dimethyl ether can be used according to the method of the invention for cleaning metal and plastic parts, defluxing printed wiring assemblies, electrical transformer PCB decontamination, cleaning of medical devices, as a process carrier gas for finish application and sterilization, in vapor blanketing for vapor phase soldering, in dry cleaning, and the like.

The cleaning solvent compound or blend according to the invention preferably has a low toxicity (from 100 to 1000 ppm TLV; CFC-113, TLV=1000 ppm), a relatively low solvency, i.e., a Kauri-Butanol (KB) value of less than 40, and low water solubility. If possible, it should also azeotrope with common solvents, be non-flammable, and compatible with elastomers and plastics.

$C_1$-$C_4$ fluorocarbons are most preferred. Fluorine substituents impart stability and generally low toxicity, and most such compounds are non-flammable. By contrast, chlorocarbons and chlorofluorocarbons (CFC's) are less preferred because chlorine causes environmental problems.

Taking the foregoing considerations into account, a lower halocarbon suitable for use as a cleaning solvent at an elevated pressure according to the method of the invention is preferably a $C_1$-$C_4$ hydrocarbon substituted with one or more fluorine and/or chlorine atoms and having a boiling point less than about 38° C. (100° F.) at one atmosphere pressure, preferably in the range of from about −130° to 21° C. (−202° F. to 70° F.) or less, especially about −68° C. to 20.5° C. (−90° F. to 69° F.). The lower limits of either of these ranges could be increased to −42° C. (−45° F.) or even 2° C. (35° F.) in order to limit the process to solvents which would not require costly, ultra-low temperature chilling equipment for stripping solvent vapor from the circulating gas.

Tables 1 and 2 give boiling points at 1 atm for a variety of lower halocarbons. Compounds with boiling points over 38° C. at 1 atm are included for purposes of comparison:

TABLE 1

Ethane HCFs and HCFCs

| Formula | Boiling Point °C. |
|---|---|
| $CF_3CF_2H$ | −48.5 |
| $CF_3CH_3$ | −47.6 |
| $CH_3CHF_2$ | −26.5 |
| $CF_3CFH_2$ | −24.7 |
| $CF_3CHClF$ | −12 |
| $CH_3CClF_2$ | −9.2 |
| $CF_3CHCl_2$ | 28.7 |
| $CH_3CCl_2F$ | 32 |
| $CF_2ClCH_2Cl$ | 46.8 |

TABLE 2

Propane and Butane HCFs and HCFCs

| Compound | Boiling Point °C. |
|---|---|
| $CF_3CF_2CF_2H$ | −16.3 |
| $CF_3CFHCF_3$ | −18.3 |
| $CF_3CH_2CF_3$ | −1.1 |
| $CF_3CF_2CFH_2$ | −1.4 |
| $CF_3CHFCF_2H$ | 6.5 |
| $HCF_2CF_2CF_2H$ | 12.6 |
| $CF_3CF_2CH_3$ | −18.3 |
| $CF_3CH_2CF_2H$ | 15.3 |
| $HCF_2CH_2CFH_2$ | 25.0 |
| $HCF_2CF_2CH_3$ | −0.8 |
| $CF_3CHClCF_3$ | 14.1 |
| $CF_3CFHCF_2Cl$ | 17.6 |
| $CF_3CF_2CH_2Cl$ | 28.1 |
| $HCF_2CF_2CH_2Cl$ | 54.8 |
| $CF_3CHClCF_2Cl$ | 50.8 |
| $CF_3CFClCFHCl$ | 51.9 |
| $CF_3CHClCFHCl$ | 70.1 |
| $CF_3CHClCH_2Cl$ | 76.7 |
| $CF_3CF_2CF_2CF_2H$ | 15.1 |
| $CF_3CFHCFHCF_3$ | 25.4 |
| $CF_3CF_2CF_2CFH_2$ | 27.5 |
| $HCF_2CF_2CF_2CF_2H$ | 42.5 |
| $CF_3CF_2CF_2CH_3$ | 15.1 |
| $CF_2CF_2CF_2CHCl$ | 38.1 |

Table 3 compares the properties of a number of solvents usable in the process of the invention, as compared to CFC 113:

TABLE 3

| Product | Formula | B.P. °C. | TLV | KB Val. |
|---|---|---|---|---|
| DME | CH$_3$OCH$_3$ | −24.8 | | 60 |
| CFC-11 | CCl$_3$F | 23.8 | 1000 | 60 |
| CFC-12 | CCl$_2$F$_2$ | −29.8 | 1000 | 18 |
| CFC-13 | CClF$_3$ | −81.1 | 1000 | |
| FC-14 | CF$_4$ | −127.8 | 1000 | |
| HCFC-22 | CHClF$_2$ | −40.8 | 1000 | 25 |
| HCFC-23 | CHF$_3$ | −81.7 | 1000 | |
| CFC-112 | CCl$_2$FCCl$_2$F | 92.8 | | |
| CFC-113 | CCl$_2$FCClF$_2$ | 47.6 | 1000 | 31 |
| CFC-114 | CClF$_2$FCClF$_2$ | 3.8 | 1000 | 12 |
| CFC-115 | CClF$_2$CF$_3$ | −38.7 | 1000 | |
| FC-116 | CF$_3$CF$_3$ | −77.8 | 1000 | |
| HCFC-123 | CF$_3$CHCl$_2$ | 27.9 | 100 | 60 |
| HCFC-124 | CF$_3$CHClF | −11.0 | 500 | 22 |
| HCF-125 | CF$_3$CHF$_2$ | −48.5 | 1000 | >10 |
| HCF-134a | CF$_3$CH$_2$F | −26.5 | 1000 | ~10 |
| HCFC-141b | CH$_3$CCl$_2$F | 32.0 | 100 | 58 |
| HCFC-142b | CH$_3$CClF$_2$ | −9.8 | 1000 | 20 |
| HCFC-152a | CH$_3$CHF$_2$ | −24.7 | 1000 | 11 |
| HCFC-502 | CHClF$_2$/CClF$_2$CF$_3$ | −45.4 | 1000 | |

In Table 3, TLV refers to toxicity threshold limit value in parts per million. The system of the invention can limit actual emissions to 10 ppm or less, allowing any of the foregoing halocarbons to be used. KB value is a known test for solvent activity (KB of butanol=1), a higher value indicating a more active solvent. HCFC-22 has a KB of about 25, whereas dimethyl ether (DME) has a Kb of 60.

Solvents according to the invention preferably have a KB of 10 or higher. For optimum cleaning action, a blend of a more aggressive solvent with a less aggressive solvent, i.e. where the KB values differ by about 20 or more, is often best. The solvent KB or overall KB of the blend should range from 10 to 150, more generally 30 to 150, depending on the items to be cleaned.

Figure 2:
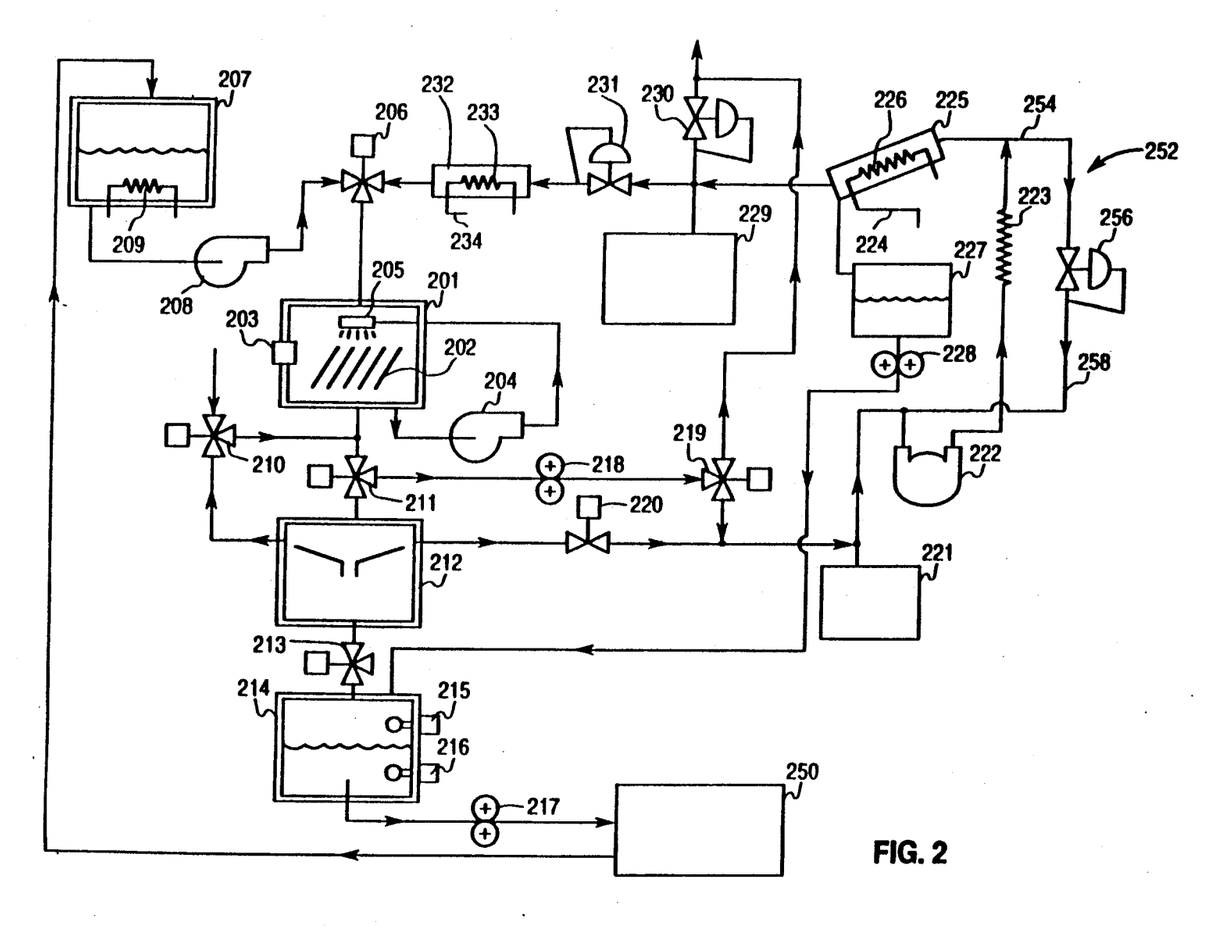
FIG. 2 is a schematic diagram of an alternative embodiment of a cleaning system according to the invention particularly suited for use with a low boiling solvent.

Referring now to FIG. 2, a system 200 for cleaning articles 202 such as printed wiring assemblies using a low boiling solvent such as HCFC-22 (CHClF$_2$) is similar in construction and operation to the system of FIG. 1. A pressure chamber 201 is initially open to the atmosphere. Articles 202 are placed in chamber 201, and chamber 201 is sealed. Valves 206 and 210 are closed. Valve 211 is opened in the direction of vacuum pump 218, whereon pump 218 evacuates chamber 201 via a valve 219, which evacuates chamber 201 to the atmosphere, directly or through a carbon absorber (not shown).

The HCFC-22 solvent is stored in a reservoir tank 207 in liquid form at 70° F. at a pressure of 121 psig as maintained by a heater 209. Valve 211 is then closed, and valve 206 is opened in the direction of tank 207 and a pump 208 disposed in a conduit connecting tank 207 to chamber 201. Pump 208 operates to draw the solvent into chamber 201 from tank 207, and supplies additional pressure to maintain the HCFC-22 solvent as a liquid at the temperature of chamber 201, generally at least about 70° F. A variety of cleaning processes can then be carried out in chamber 201, including flushing, spraying (optionally with recirculation), or immersion, optionally with agitation or ultrasonic treatment. In the illustrated embodiment, an optional pump 204 recirculates solvent to a sprayer 205, and an ultrasonic generator 203 is disposed in chamber 201 for treating articles 202. The temperature and pressure for cleaning using a low boiling solvent according to the invention generally will range from about 0° C. to 150° C., at a pressure ranging from below atmospheric (e.g., 0.51 atm or less) to as high as 34 atm, or from about 7 to 500 psia. To use a cleaning temperature from 21° C. to 150° C., the cleaning process will generally be carried out an elevated pressure ranging from near atmospheric (e.g., 1.01 atm) to 34 atm (about 15 to 500 psia.)

When cleaning is completed, valve 211 opens in the direction of a gas/liquid separator 212. A separator gas outlet valve 220 is closed. This drains liquid from chamber 201 under pressure into separator 212. A separator liquid outlet valve 213 is opened to drain liquid into a receiver tank 214. Valve 213 is then closed. A pump 217, controlled by level sensors 215, 216 mounted at different heights within tank 214, returns the liquid under pressure to a reclamation unit 250, such as a hermetic still, for return to the solvent tank 207. When upper sensor 215 indicates that the solvent level has reached its high level, pump 217 operates until lower sensor 216 indicates that the solvent level has reached its low level, i.e., that tank 214 is nearly empty.

Valve 220 opens, generally at the time valve 213 closes, venting separator 212 to a low side accumulator 221 and a compressor 222. The rate of pressure relief from chamber 201 will depend on the ability of the item being cleaned to withstand pressure changes and how cold the item can be permitted to get. Heat may be supplied to the item at this stage, for example, by IR radiation, convection, forced convection, induction, or conduction from a heat source. If pockets of solvent remain on the item after evacuation, additional drying cycles of heat and evacuation can be conducted to complete removal of the solvent.

If chamber 201 is evacuated to a standard vacuum pressure such as 28 mmHg, the remaining HCFC-22 solvent will be at about −123° F. Cycling of warm air at 120° F. produces a temperature difference of 243 degrees at the places where liquid remains. The temperature difference elsewhere on the item is much less, generally around 50 degrees if the item is at 70° F. This would provide very effective heat transfer and drying to the wet areas of the item. It would be undesirable to remove a cold item into room air because condensation of atmospheric moisture would occur. Accordingly, the item may be heated to room temperature by one or more of the methods noted above prior to removal. The air handling and stripper system (see 225, 229, 231, 232 discussed below) can provide heated air to chamber 201 for this purpose.

Vapor from separator 212 is drawn into compressor 222 due to the pressure differential, a combination of suction from compressor 222 and the pressure in chamber 201 and separator 212. The gas will be a mixture of residual air in the system and HCFC-22 vapor. Compressor 222 increases the pressure to a desired value, generally about 60-100 psig. The gas is then cooled in an aftercooler 223 and enters a stripper 225. The heat transfer surface 226 of stripper 225 is maintained by a chiller 224 at a temperature sufficiently low (e.g., −30° F. or less) to condense HCFC-22 vapor. The condensed liquid solvent accumulates at a low temperature in a receiver tank 227. A pump 228 periodically returns solvent to tank 214.

Pressure in the low pressure side of the closed loop is controlled by a bypass loop 252. A line 254 from the discharge of aftercooler 223 is connected to the inlet of a controller-equipped back pressure valve 256. The discharge of back pressure valve 256 is connected by a line 258 to the low pressure side of the closed loop and suction from compressor 222. If the pressure in line 258 exceeds the set point of the controller for valve 256, preferably 1 atm absolute pressure, valve 256 closes to prevent gas from recirculating back to compressor 222 through bypass loop 252. If the pressure in line 258 is at or below the set point, valve 256 opens, allowing gas to recirculate back to compressor 222 and avoiding further reduction in the low side pressure.

This arrangement permits compressor 222 to run continuously, avoiding short cycling and overheating of the compressor drive motor. Uniform pressure is maintained on the low pressure side of the closed loop with minimal additional equipment. Any vapor that enters the low pressure side from chamber 201 or separator 212 is immediately conducted to the high pressure side of the closed loop where it is condensed by stripper 225. As an alternative, bypass loop 252 can be omitted, and accumulator 221 can be provided with a pressure-actuated switch (not shown) that activates compressor 222 when the accumulator pressure reaches a predetermined threshold.

Gas (i.e., air with relatively little solvent vapor) from stripper 225 is stored in a high side accumulator 229. As air enters the system, the pressure in accumulator 229 increases. When the set point of a pressure relief valve 230 is reached, venting to the atmosphere of solvent dehumidified air and a small amount of HCFC-22 vapor will occur. Gas for drying is drawn from accumulator 229 through a pressure relief valve 231 and a heater 232 having a heat source (coil) 234. Valve 206 opens in a direction to permit gas flow from heater 232 to chamber 201, valve 211 opens to permit gas flow from chamber 201 to separator 212, and valve 220 opens to permit recirculation back to compressor 222, forming a loop. As solvent is evaporated in chamber 201 it is recovered in stripper 225.

After articles 202 are dry and warm, with valves 206, 210 closed, valve 211 is opened in a direction to permit flow to pump 218, and valve 219 opens to its second position so that the effluent is discharged to the stripping loop (accumulator 221, compressor 222, etc.) When evacuation is complete, valve 211 is closed, opening valve 210. This breaks the vacuum and permits removal of the item 202. In this manner, a low boiling HCFC solvent such as $CHClF_2$ can be effectively used in a wide variety of cleaning or other treatment applications with minimal release of solvent to the atmosphere.

Thus, it should be apparent that there has been provided in accordance with the present invention an cleaning apparatus and method having an emission control system for solvents having volatile constituents that fully satisfies the aims and advantages set forth above. Although the invention has been described in conjunction with specific embodiments thereof, it is evident that many alternatives, modifications and variations will be apparent to those skilled in the art. For example, the system could operate at a reduced pressure (less than 1 atm) in order to use a very high boiling solvent. Accordingly, it is intended to embrace all such alternatives, modifications and variations that fall within the spirit and broad scope of the appended claims.

I claim:

1. A method for cleaning an article with a solvent having a boiling point such that the solvent is a gas at room temperature and one atmosphere pressure, which comprises:
   (A) disposing the article in a chamber and sealing the chamber;
   (B) introducing said the solvent into the chamber so that the solvent contacts the article;
   (C) pressurizing the sealed chamber so that the solvent is in a liquid state and removes contaminants from the article;
   (D) purging the chamber to remove the solvent; and
   (E) removing the treated article from the chamber.

2. The method of claim 1, wherein steps (B) and (C) further comprise introducing the solvent into the chamber in a gaseous state, then pressurizing the chamber in order to condense the solvent and clean the article therewith.

3. The method of claim 1, wherein the solvent comprises a lower halocarbon having a boiling point in the range of $-130°$ C. to $21°$ C.

4. The method of claim 3, wherein the halocarbon is a $C_1-C_4$ fluorocarbon or chlorofluorocarbon.

5. The method of claim 4, wherein the solvent consists essentially of a blend of the $C_1-C_4$ fluorocarbon, hydrofluorocarbon or chlorofluorocarbon and a cosolvent selected from the group consisting of alcohols, ethers, aldehydes, ketones, carboxylic acids, esters, and combinations thereof.

6. The method of claim 5, wherein the weight ratio of the $C_1-C_4$ fluorocarbon, hydrofluorocarbon or chlorofluorocarbon to the cosolvent is the range of about 200:1 to 10:1.

7. The method of claim 5, wherein the solvent blend is non-azeotropic.

8. The method of claim 3, wherein the solvent consists essentially of a blend of the $C_1-C_4$ fluorocarbon, hydrofluorocarbon or chlorofluorocarbon and a cosolvent selected from the group consisting of methanol, ethanol, propanol, isopropanol, butanol, ethylene glycol, glycerine, diethyl ether, dimethyl ether, formaldehyde, dimethyl ketone, diethyl ketone, methylethyl ketone, formic acid, acetic acid, stearic acid, oleic acid, and compatible combinations thereof.

9. The method of claim 3, wherein the halocarbon consists of one or more fluorocarbons free of chlorine atoms.

10. The method of claim 1, wherein the halocarbon consists essentially of $CHClF_2$.

11. The method of claim 1, wherein the solvent consists essentially of a blend of $CHClF_2$ and dimethyl ether.

12. The method of claim 1, wherein steps (B) and (C) further comprise storing a supply of the solvent in a pressurized tank, and drawing the solvent from the pressurized tank into the chamber in a liquid state.

13. The method of claim 1, wherein step (C) further comprises maintaining the chamber at a temperature in the range of $21°$ C. to $150°$ C. and a pressure in the range of from about 1.01 to 34 atm for a period of time sufficient to clean the article.

14. The method of claim 1, further comprising a step (F) of purifying and recycling the solvent to the pressure chamber under conditions substantially effective to prevent escape of the solvent into the atmosphere.

15. The method of claim 1, wherein the solvent has a boiling point of less than about $20.5°$ C. at one atmosphere pressure.

16. The method of claim 1, further comprising spraying the article in the chamber with the solvent.

17. The method of claim 16, further comprising recirculating sprayed solvent and respraying the article in the chamber with recirculated solvent.

18. The method of claim 1, further comprising ultrasonically treating the article in the chamber in a manner effective to aid in cleaning.

19. A method for treating an article with a solvent having a boiling point of less than about 38° C. at one atmosphere pressure, which comprises:
   disposing the article in a chamber;
   sealing the chamber;
   introducing the solvent into the chamber so that the solvent contacts the article at a temperature at which the solvent would be a gas at atmospheric pressure;
   pressurizing the chamber to an elevated pressure greater than atmospheric pressure so that the solvent is in a liquid state as it contacts the article;
   purging the chamber to remove the solvent; and
   removing the treated article from the chamber.

20. The method of claim 19, wherein the chamber is pressurized by a pump that pumps the solvent therein, and is purged by draining liquid solvent from the chamber and then evacuating the chamber with a vacuum pump.

21. A method for cleaning an article with a solvent, which comprises:
   disposing the article in a chamber;
   sealing the chamber;
   evacuating the chamber to remove air therefrom;
   introducing a solvent having a boiling point in the range of −130° C. to 21° C. at atmospheric pressure so that the solvent contacts the article;
   pressurizing the chamber so that the solvent is in a liquid state as it contact the article;
   draining liquid solvent from the chamber;
   evacuating the chamber to remove solvent vapor;
   removing the treated article from the chamber;
   condensing the solvent vapor removed from the chamber to recover liquid solvent;
   separating the liquid solvent drained from the chamber from contaminants removed from the treated article; and
   recycling separated liquid solvent and recovered liquid solvent to the chamber for further cleaning operations.

22. The method of claim 21, wherein the step of evacuating the chamber to remove solvent vapor chills the article, further comprising a step of heating the article prior to removing the treated article from the chamber.

23. The method of claim 21, wherein the solvent comprises a lower halocarbon having a boiling point in the range of −68° C. to 20.5° C. at one atmosphere pressure and contacts the article in the chamber at a temperature in the range of 21° C. to 150° C. and a pressure in the range of about 15 to 500 psia.

24. The method of claim 21, wherein the draining, separating and recycling steps further comprise:
   draining the liquid solvent under pressure from the chamber into a gas/liquid separator;
   draining liquid solvent from the gas/liquid separator into a receiver tank;
   sealing off the separator from the receiver tank;
   drawing a gas comprising residual air and solvent vapor from the separator into a low pressure side of a compressor which pressurizes the gas and feeds it from a high pressure side of the compressor to a stripper; and
   condensing liquid solvent from the gas in the stripper.

25. The method of claim 24, further comprising venting residual gas from the stripper to the atmosphere.

26. The method of claim 24, wherein the step of evacuating the chamber to remove solvent vapor chills the article, further comprising a step of heating the article prior to removing the treated article from the chamber by heating residual gas from the stripper and returning the heated gas to the chamber to heat the article.

27. The method of claim 24, further comprising recirculating gas on the high pressure side of the compressor to the low pressure side of the compressor when the pressure on the low pressure side is at or below a set point value.

28. The method of claim 24, further comprising chilling the gas from the compressor before it enters the stripper.

29. The method of claim 24, further comprising returning liquid solvent recovered in the stripper to the receiver tank.

30. The method of claim 21, further comprising storing a supply of the recycled solvent in a pressurized tank, and the step of introducing the solvent into the chamber further comprises pumping the solvent from the pressurized tank into the chamber in a liquid state, and the step of recycling separated and recovered liquid solvent further comprises distilling the solvent to remove impurities therefrom and returning recycled solvent to the pressurized tank.

31. The method of claim 21, wherein the introducing step further comprises spraying the article in the chamber with the solvent.

32. The method of claim 21, further comprising ultrasonically treating the article in the chamber in a manner effective to aid in cleaning.

* * * * *